(12) United States Patent
Lei et al.

(10) Patent No.: US 11,283,582 B2
(45) Date of Patent: Mar. 22, 2022

(54) UPLINK TRANSMISSION BLANKING

(71) Applicant: MOTOROLA MOBILITY LLC, Chicago, IL (US)

(72) Inventors: Haipeng Lei, Beijing (CN); Xiaodong Yu, Beijing (CN); Zhi Yan, Beijing (CN); Hongchao Li, Beijing (CN)

(73) Assignee: Motorola Mobility LLC, Chicago, IL (US)

( * ) Notice: Subject to any disclaimer, the term of this patent is extended or adjusted under 35 U.S.C. 154(b) by 108 days.

(21) Appl. No.: 16/476,243

(22) PCT Filed: Jan. 6, 2017

(86) PCT No.: PCT/CN2017/070469
§ 371 (c)(1),
(2) Date: Jul. 5, 2019

(87) PCT Pub. No.: WO2018/126447
PCT Pub. Date: Jul. 12, 2018

(65) Prior Publication Data
US 2019/0356461 A1    Nov. 21, 2019

(51) Int. Cl.
*H04L 5/00* (2006.01)
*H04W 72/10* (2009.01)
*H04W 72/12* (2009.01)

(52) U.S. Cl.
CPC .......... *H04L 5/0094* (2013.01); *H04W 72/10* (2013.01); *H04W 72/1257* (2013.01); *H04W 72/1268* (2013.01)

(58) Field of Classification Search
CPC . H04W 72/0446; H04W 72/04; H04W 72/14; H04W 72/0453; H04W 72/1268; H04W 72/0413
See application file for complete search history.

(56) References Cited

U.S. PATENT DOCUMENTS

2010/0135235 A1 * 6/2010 Ji ............... H04W 74/0866
370/329
2010/0232285 A1    9/2010 Lee et al.
(Continued)

OTHER PUBLICATIONS

PCT/CN2017/070469, "Notification of Transmittal of the International Search Report and the Written Opinion of the International Searching Authority, or the Declaration", International Searching Authority, dated Sep. 30, 2017, pp. 1-11.

*Primary Examiner* — Asad M Nawaz
*Assistant Examiner* — Najeeb Ansari
(74) *Attorney, Agent, or Firm* — Kunzler Bean & Adamson

(57) ABSTRACT

Apparatuses, methods, and systems are disclosed for uplink transmission blanking. One apparatus (200) includes a receiver (212) that: receives (602) a first signal from a base unit, wherein the first signal is used for indicating scheduling information for a first uplink transmission; and receives (604) a third signal from the base unit. The third signal is used for determining a first one or more symbols of the first uplink transmission to be blanked. The apparatus (200) also includes a processor (202) that determines (606) the first one or more symbols of the first uplink transmission to be blanked based on the third signal. The apparatus (200) includes a transmitter (210) that transmits (608) the first uplink transmission to the base unit with the first one or more symbols blanked.

18 Claims, 7 Drawing Sheets

(56) References Cited

U.S. PATENT DOCUMENTS

| | | |
|---|---|---|
| 2014/0269455 A1 | 9/2014 | Kim et al. |
| 2015/0029988 A1 | 1/2015 | Chai et al. |
| 2015/0173069 A1 | 6/2015 | Cucala Garcia |
| 2016/0227557 A1* | 8/2016 | Fanous .............. H04W 72/1215 |
| 2016/0278117 A1 | 9/2016 | Sahlin et al. |
| 2017/0325207 A1* | 11/2017 | Wolf ................. H04W 72/0406 |
| 2018/0145818 A1* | 5/2018 | Choi ..................... H04L 5/0051 |
| 2018/0213551 A1* | 7/2018 | Wang .................... H04L 5/0044 |
| 2019/0082446 A1* | 3/2019 | Guo ...................... H04L 1/1812 |
| 2019/0132844 A1* | 5/2019 | Lopez .................. H04L 1/0009 |

* cited by examiner

UPLINK TRANSMISSION BLANKING

FIELD

The subject matter disclosed herein relates generally to wireless communications and more particularly relates to uplink transmission blanking.

BACKGROUND

The following abbreviations are herewith defined, at least some of which are referred to within the following description: Third Generation Partnership Project ("3GPP"), Positive-Acknowledgment ("ACK"), Binary Phase Shift Keying ("BPSK"), Clear Channel Assessment ("CCA"), Cyclic Prefix ("CP"), Channel State Information ("CSI"), Common Search Space ("CSS"), Discrete Fourier Transform Spread ("DFTS"), Downlink Control Information ("DCI"), Downlink ("DL"), Downlink Pilot Time Slot ("DwPTS"), Enhanced Clear Channel Assessment ("eCCA"), Enhanced Mobile Broadband ("eMBB"), Evolved Node B ("eNB"), European Telecommunications Standards Institute ("ETSI"), Frame Based Equipment ("FBE"), Frequency Division Duplex ("FDD"), Frequency Division Multiple Access ("FDMA"), Guard Period ("GP"), Hybrid Automatic Repeat Request ("HARQ"), Internet-of-Things ("IoT"), Licensed Assisted Access ("LAA"), Load Based Equipment ("LBE"), Listen-Before-Talk ("LBT"), Long Term Evolution ("LTE"), Multiple Access ("MA"), Modulation Coding Scheme ("MCS"), Machine Type Communication ("MTC"), Multiple Input Multiple Output ("MIMO"), Multi User Shared Access ("MUSA"), Narrowband ("NB"), Negative-Acknowledgment ("NACK") or ("NAK"), Next Generation Node B ("gNB"), Non-Orthogonal Multiple Access ("NOMA"), Orthogonal Frequency Division Multiplexing ("OFDM"), Primary Cell ("PCell"), Physical Broadcast Channel ("PBCH"), Physical Downlink Control Channel ("PDCCH"), Physical Downlink Shared Channel ("PDSCH"), Pattern Division Multiple Access ("PDMA"), Physical Hybrid ARQ Indicator Channel ("PHICH"), Physical Random Access Channel ("PRACH"), Physical Resource Block ("PRB"), Physical Uplink Control Channel ("PUCCH"), Physical Uplink Shared Channel ("PUSCH"), Quality of Service ("QoS"), Quadrature Phase Shift Keying ("QPSK"), Radio Resource Control ("RRC"), Random Access Procedure ("RACH"), Random Access Response ("RAR"), Reference Signal ("RS"), Resource Spread Multiple Access ("RSMA"), Round Trip Time ("RTT"), Receive ("RX"), Sparse Code Multiple Access ("SCMA"), Scheduling Request ("SR"), Single Carrier Frequency Division Multiple Access ("SC-FDMA"), Secondary Cell ("SCell"), Shared Channel ("SCH"), Signal-to-Interference-Plus-Noise Ratio ("SINR"), System Information Block ("SIB"), Transport Block ("TB"), Transport Block Size ("TBS"), Time-Division Duplex ("TDD"), Time Division Multiplex ("TDM"), Transmission Time Interval ("TTI"), Transmit ("TX"), Uplink Control Information ("UCI"), User Entity/Equipment (Mobile Terminal) ("UE"), Uplink ("UL"), Universal Mobile Telecommunications System ("UMTS"), Uplink Pilot Time Slot ("UpPTS"), Ultra-reliability and Low-latency Communications ("URLLC"), and Worldwide Interoperability for Microwave Access ("WiMAX"). As used herein, "HARQ-ACK" may represent collectively the Positive Acknowledge ("ACK") and the Negative Acknowledge ("NAK"). ACK means that a TB is correctly received while NAK means a TB is erroneously received.

In certain wireless communications networks, URLLC may have a data payload that is small. According to some configurations, URLLC may have a periodically occurring packet arrival rate and a packet size may be 32 bytes, 50 bytes, 200 bytes, and so forth.

In certain configurations, for URLLC, the one-way user plane latency may be 0.5 ms for UL, and 0.5 ms for DL. Moreover, URLLC reliability may be evaluated by a success probability of transmitting X bytes within 1 ms. This may be the time it takes to deliver a small data packet from the radio protocol layer 2/3 service data unit ("SDU") ingress point to the radio protocol layer 2/3 SDU egress point of the radio interface, at a certain channel quality (e.g., coverage-edge). In various configurations, the target for reliability may be $1-10^{-5}$ within 1 ms. In certain configurations, a general URLLC reliability requirement for one transmission of a packet may be $1-10^{-5}$ for X bytes (e.g., 20 bytes) with a user plane latency of 1 ms. In some configurations, there may be interference between URLLC and eMBB communications.

BRIEF SUMMARY

Apparatuses for uplink transmission blanking are disclosed. Methods and systems also perform the functions of the apparatus. In one embodiment, the apparatus includes a receiver that: receives a first signal from a base unit, wherein the first signal is used for indicating scheduling information for a first uplink transmission; and receives a third signal from the base unit. In various embodiments, the third signal is used for determining a first one or more symbols of the first uplink transmission to be blanked. The apparatus also includes a processor that determines the first one or more symbols of the first uplink transmission to be blanked based on the third signal. In certain embodiments, the apparatus includes a transmitter that transmits the first uplink transmission to the base unit with the first one or more symbols blanked.

In one embodiment, the third signal indicates the first one or more symbols of the first uplink transmission to be blanked. In a further embodiment, the third signal indicates a number of symbols to be blanked at a beginning of the first uplink transmission. In certain embodiments, the third signal is included in the first signal. In some embodiments, the third signal is used to indicate a transmission resource for a second uplink transmission.

In various embodiments, the first one or more symbols of the first uplink transmission are blanked in response to the first uplink transmission immediately following the transmission resource for the second uplink transmission. In some embodiments, a priority of the first uplink transmission is lower than a priority of the second uplink transmission. In one embodiment, the processor determines the first one or more symbols of the first uplink transmission to be blanked based on cell coverage, subcarrier spacing, timing offset between the first uplink transmission and the second uplink transmission, or some combination thereof. In a further embodiment, the first one or more symbols of the first uplink transmission are blanked by puncturing. In various embodiments, the first one or more symbols of the first uplink transmission are blanked by rate matching.

A method for uplink transmission blanking, in one embodiment, includes receiving a first signal from a base unit. In certain embodiments, the first signal is used for indicating scheduling information for a first uplink transmission. The method also includes receiving a third signal from the base unit. In some embodiments, the third signal is used for determining a first one or more symbols of the first uplink transmission to be blanked. The method includes determining the first one or more symbols of the first uplink transmission to be blanked based on the third signal. The method also includes transmitting the first uplink transmission to the base unit with the first one or more symbols blanked.

In one embodiment, an apparatus includes a transmitter that: transmits a first signal to a first remote unit, wherein the first signal is used to indicate scheduling information for the first remote unit for a first uplink transmission; transmits a second signal to a second remote unit, wherein the second signal is used to indicate a transmission resource for the second remote unit for a second uplink transmission; and transmits a third signal to the first remote unit, wherein the third signal is used for the first remote unit to determine the first one or more symbols of the first uplink transmission to be blanked. In some embodiments, the apparatus also includes a processor that determines the first one or more symbols of the first uplink transmission to be blanked. In certain embodiments, the apparatus includes a receiver that receives the first uplink transmission from the first remote unit with the first one or more symbols blanked.

In one embodiment, the third signal indicates the first one or more symbols of the first uplink transmission to be blanked. In a further embodiment, the third signal indicates a number of symbols to be blanked at a beginning of the first uplink transmission. In certain embodiments, the third signal is included in the first signal. In some embodiments, the processor determines the first one or more symbols of the first uplink transmission to be blanked based on cell coverage, subcarrier spacing, timing offset between the first uplink transmission and the second uplink transmission, or some combination thereof.

In various embodiments, the third signal is the same as the second signal. In some embodiments, the first one or more symbols of the first uplink transmission are blanked in response to the first uplink transmission immediately following the second uplink transmission. In one embodiment, a priority of the first uplink transmission is lower than a priority of the second uplink transmission. In a further embodiment, the first one or more symbols of the first uplink transmission are blanked by puncturing. In certain embodiments, the first one or more symbols of the first uplink transmission are blanked by rate matching.

A method for uplink transmission blanking, in one embodiment, includes transmitting a first signal to a first remote unit, wherein the first signal is used to indicate scheduling information for the first remote unit for a first uplink transmission. In certain embodiments, the method includes transmitting a second signal to a second remote unit, wherein the second signal is used to indicate a transmission resource for the second remote unit for a second uplink transmission. The method also includes transmitting a third signal to the first remote unit, wherein the third signal is used for the first remote unit to determine the first one or more symbols of the first uplink transmission to be blanked. In some embodiments, the method includes determining the first one or more symbols of the first uplink transmission to be blanked. In various embodiments, the method includes receiving the first uplink transmission from the first remote unit with the first one or more symbols blanked.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
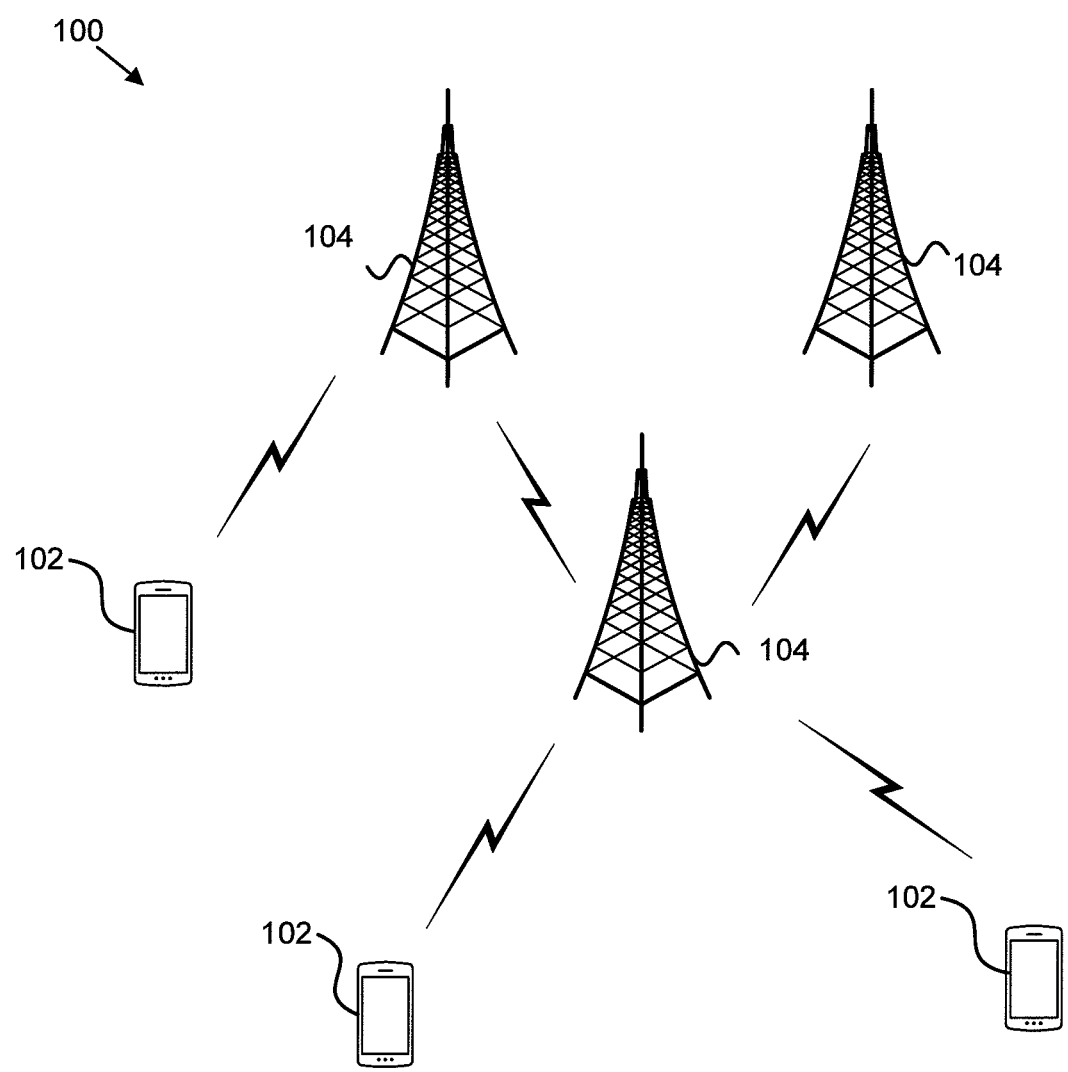
FIG. 1 is a schematic block diagram illustrating one embodiment of a wireless communication system for uplink transmission blanking.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for uplink transmission blanking. In one embodiment, the wireless communication system 100 includes remote units 102 and base units 104. Even though a specific number of remote units 102 and base units 104 are depicted in FIG. 1, one of skill in the art will recognize that any number of remote units 102 and base units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the base units 104 via UL communication signals.

The base units 104 may be distributed over a geographic region. In certain embodiments, a base unit 104 may also be referred to as an access point, an access terminal, a base, a base station, a Node-B, an eNB, a gNB, a Home Node-B, a relay node, a device, or by any other terminology used in the art. The base units 104 are generally part of a radio access network that includes one or more controllers communicably coupled to one or more corresponding base units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with the LTE of the 3GPP protocol, wherein the base unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, among other protocols. The present disclosure is not intended to be limited to the implementation of any particular wireless communication system architecture or protocol.

The base units 104 may serve a number of remote units 102 within a serving area, for example, a cell or a cell sector via a wireless communication link. The base units 104 transmit DL communication signals to serve the remote units 102 in the time, frequency, and/or spatial domain.

In one embodiment, a base unit 104 may transmit a first signal to a first remote unit 102. In such an embodiment, the first signal may be used to indicate scheduling information for the first remote unit 102 for a first uplink transmission. In some embodiments, the base unit 104 may transmit a second signal to a second remote unit 102. In such embodiments, the second signal may be used to indicate a transmission resource for the second remote unit 102 for a second uplink transmission. In various embodiments, the base unit 104 may transmit a third signal to the first remote unit 102. In such embodiments, the third signal may be used for the first remote unit 102 to determine the first one or more symbols of the first uplink transmission to be blanked. In certain embodiments, the base unit 104 may determine the first one or more symbols of the first uplink transmission to be blanked. In one embodiment, the base unit 104 may receive the first uplink transmission from the first remote unit 102 with the first one or more symbols blanked. Accordingly, a base unit 104 may be used to receive uplink transmission blanking.

In another embodiment, a remote unit 102 may receive a first signal from a base unit 104. In such an embodiment, the first signal may be used for indicating scheduling information for a first uplink transmission. In some embodiments, the remote unit 102 may receive a third signal from the base unit 104. In such embodiments, the third signal may be used for determining a first one or more symbols of the first uplink transmission to be blanked. The remote unit 102 may determine the first one or more symbols of the first uplink transmission to be blanked based on the third signal. The remote unit 102 may transmit the first uplink transmission to the base unit 104 with the first one or more symbols blanked. Accordingly, a remote unit 102 may be used for uplink transmission blanking.

Figure 2:
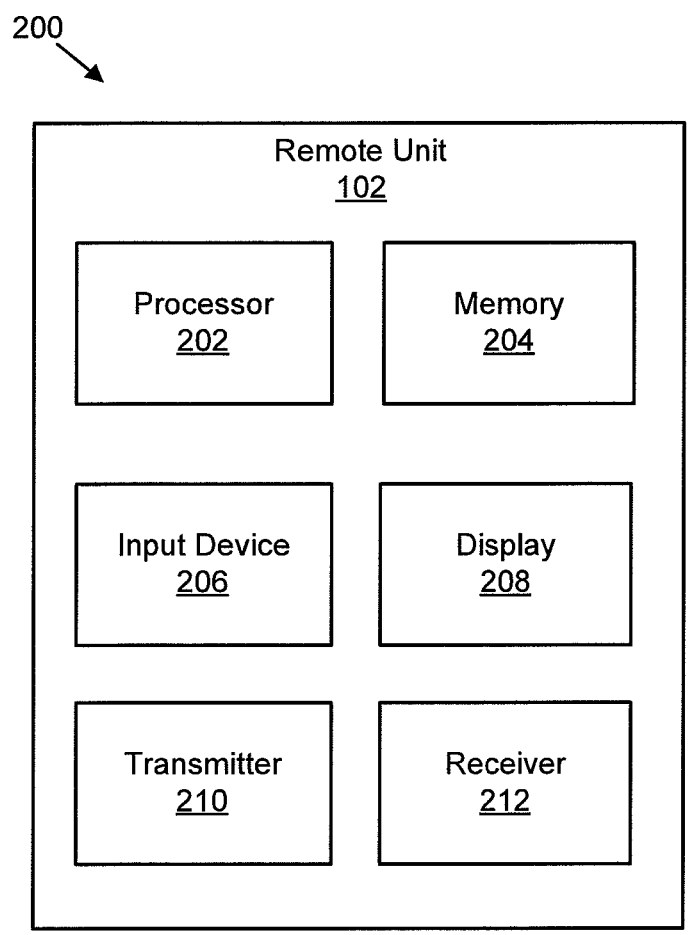
FIG. 2 is a schematic block diagram illustrating one embodiment of an apparatus that may be used for uplink transmission blanking.

FIG. 2 depicts one embodiment of an apparatus 200 that may be used for uplink transmission blanking. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. In certain embodiments, the processor 202 may determine one or more symbols of an uplink transmission to be blanked based on a signal. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to an uplink transmission. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the base unit 104 and the receiver 212 is used to receive DL communication signals from the base unit 104. In one embodiment, the receiver 212 may be used to receive: a first signal from a base unit 104, wherein the first signal is used for indicating scheduling information for a first uplink transmission; and a third signal from the base unit 104, wherein the third signal is used for determining a first one or more symbols of the first uplink transmission to be blanked. In some embodiments, the transmitter 210 may transmit the first uplink transmission to the base unit 104 with the first one or more symbols blanked. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
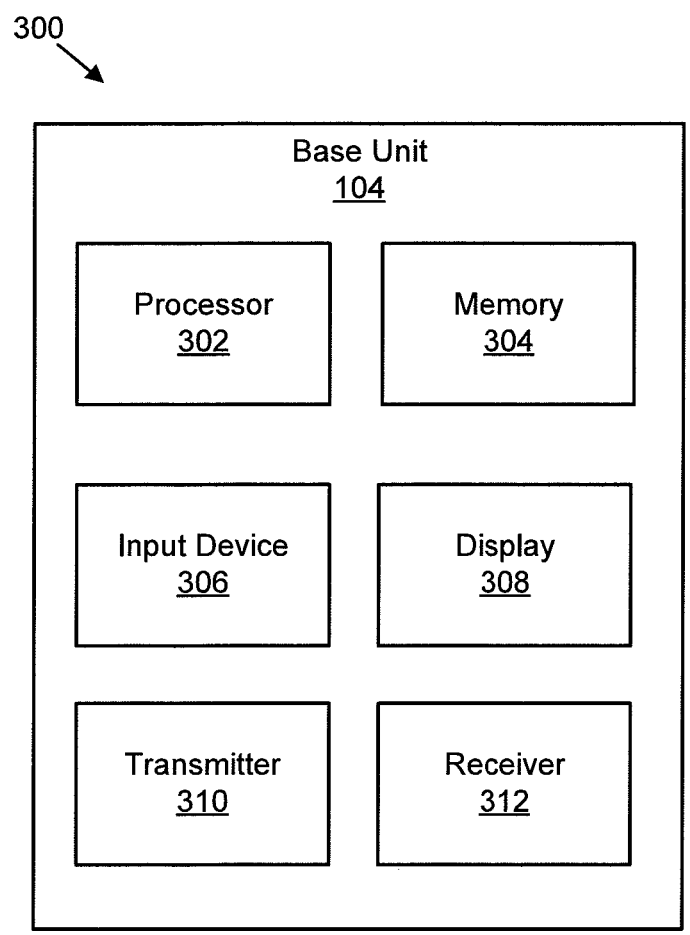
FIG. 3 is a schematic block diagram illustrating one embodiment of an apparatus that may be used for uplink transmission blanking.

FIG. 3 depicts one embodiment of an apparatus 300 that may be used for uplink transmission blanking. The apparatus 300 includes one embodiment of the base unit 104. Furthermore, the base unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In various embodiment, the transmitter 310 is used to transmit: a first signal to a first remote unit 102, wherein the first signal is used to indicate scheduling information for the first remote unit 102 for a first uplink transmission; a second signal to a second remote unit 102, wherein the second signal is used to indicate a transmission resource for the second remote unit 102 for a second uplink transmission; and a third signal to the first remote unit 102, wherein the third signal is used for the first remote unit 102 to determine the first one or more symbols of the first uplink transmission to be blanked. In certain embodiments, the processor 302 determines the first one or more symbols of the first uplink transmission to be blanked. In some embodiments, the receiver 312 receives the first uplink transmission from the first remote unit 102 with the first one or more symbols blanked. Although only one transmitter 310 and one receiver 312 are illustrated, the base unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

Figure 4:
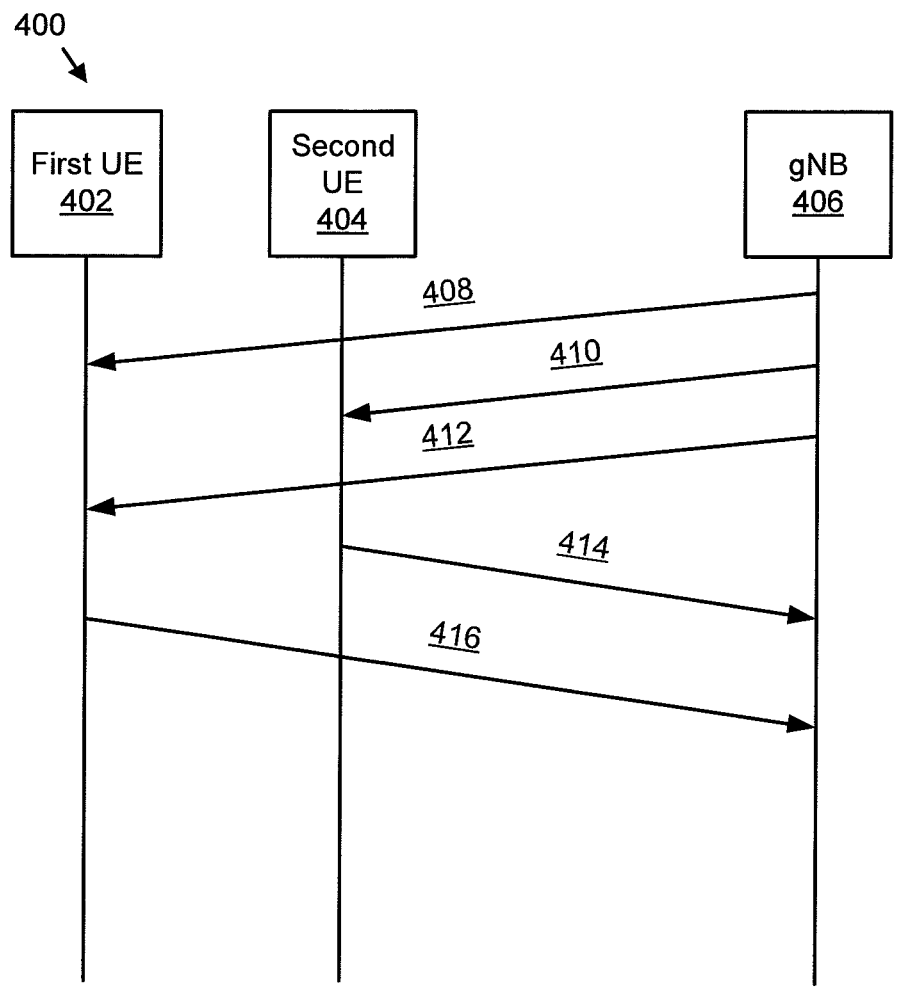
FIG. 4 illustrates one embodiment of communications for uplink transmission blanking.

FIG. 4 illustrates one embodiment of communications 400 for uplink transmission blanking. Specifically, communications 400 between a first UE 402, a second UE 404, and a gNB 406 are illustrated. In certain embodiments, the first UE 402 may be an eMBB UE, and the second UE 404 may be a URLLC UE. The communications 400 may facilitate scheduling resources for eMBB and URLLC.

A first communication 408 may include a first signal sent from the gNB 406 to the first UE 402 and used to indicate eMBB scheduling information for the first UE 402 for a first uplink transmission. Moreover, a second communication 410 may include a second signal sent from the gNB 406 to the second UE 404 and used to indicate URLLC transmission information for the second UE 404 for a second uplink transmission. In some embodiments, the second communication 410 may include RRC signaling or SIB signaling used to configure a resource pool for UL URLLC transmission, such as UL grant-free URLLC transmission.

A third communication 412 may include a third signal sent from the gNB 406 to the first UE 402. The third signal may be used by the first UE 402 to determine a first one or more symbols of the first uplink transmission to blank. The third signal may, in one embodiment, include one bit in an UL grant that may be used for blank indication. The one bit may indicate to the first UE 402 to blank the first N symbols. In some embodiments, the first UE 402 may implicitly derive the number N from the subcarrier spacing of eMBB. For example, N may be equal to 1 if the subcarrier spacing is 15 KHz and equal to 2 if the subcarrier spacing is 30 KHz.

The third signal may, in another embodiment, include two bits to provide information for blanking symbols. With two bits, there may be four indication possibilities. For example, "00" may represent there is no need for resource blanking, "01" may represent that the first symbol should be blanked, "10" may represent that the first two symbols should be blanked, and "11" may represent that the first three symbols should be blanked. The gNB 406 may select the value of the two-bit blank indication based on a cell coverage, a subcarrier spacing of eMBB, a timing offset between UL grant-free URLLC and UL eMBB, among other things.

In one embodiment, the third communication 412 is not used, and the first UE 402 uses the second communication 410 to determine a first one or more symbols of the first uplink transmission to blank. In certain embodiments, the first one or more symbols are blanked so that the first uplink transmission does not interfere with the second uplink transmission. In another embodiment, the third communication 412 is not used, and the first communication 408 includes information for the first UE 402 to determine a first one or more symbols of the first uplink transmission to blank.

A fourth communication 414 includes the second uplink transmission transmitted from the second UE 404 to the gNB 406. Further, a fifth communication 416 includes the first uplink transmission with one or more blanked symbols so that the fifth communication 416 does not interfere with the fourth communication 414. In some embodiments, the one or more blanked symbols may be blanked by puncturing or rate matching. In various embodiments, puncturing may be performed by removing certain parity bits after encoding data with an error-correction code. In certain embodiments, N symbols may be blanked. In various embodiments, N may be equal to 1 if the subcarrier spacing is 15 KHz and equal to 2 if the subcarrier spacing is 30 KHz.

Figure 5:
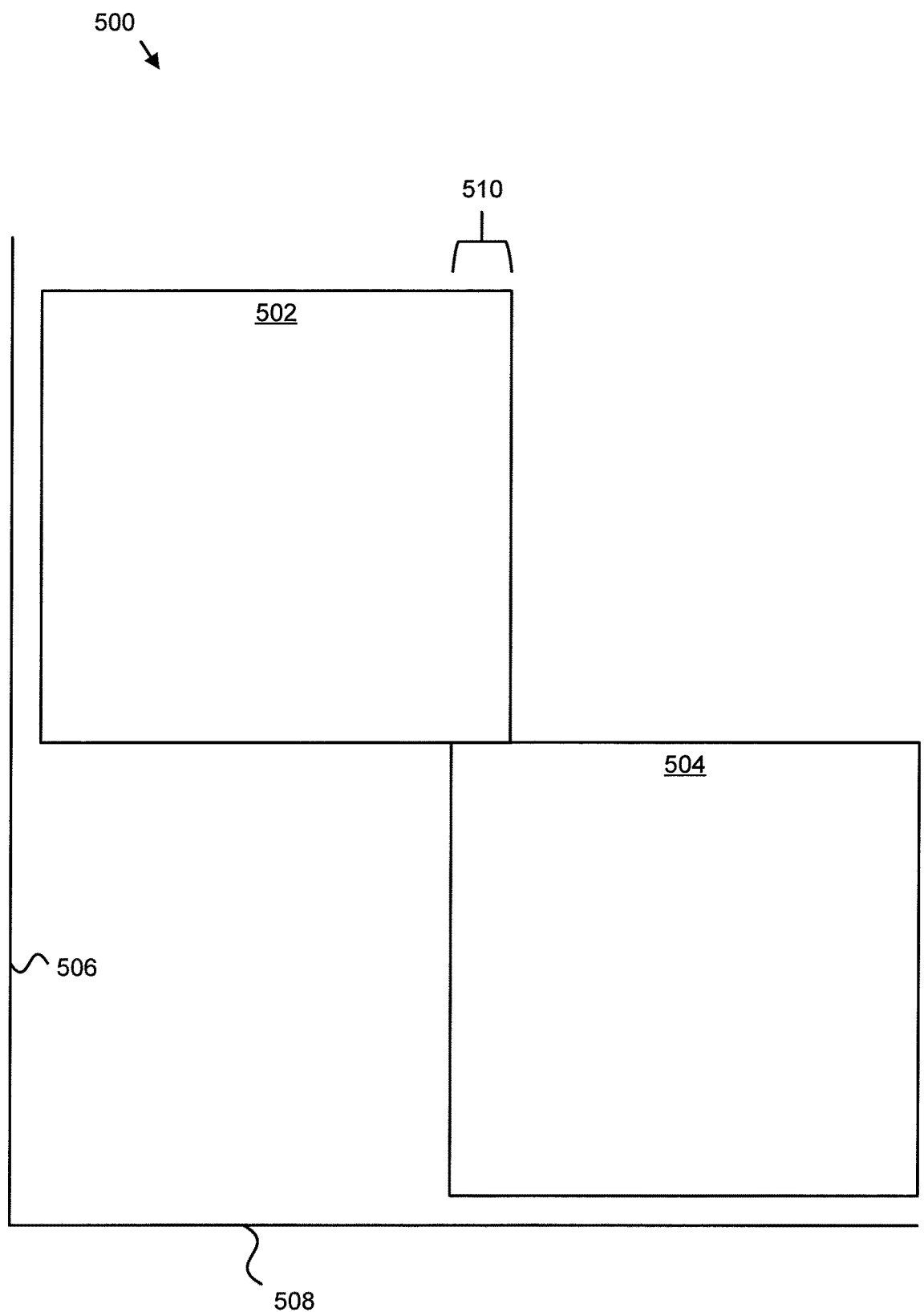
FIG. 5 is a schematic block diagram illustrating one embodiment of remote unit communications using uplink transmission blanking.

FIG. 5 is a schematic block diagram illustrating one embodiment of remote unit communications 500 using uplink transmission blanking. Specifically, a URLLC communication 502 transmitted from the second UE 404, and an eMBB communication 504 transmitted from the first UE 402, are illustrated. The URLLC communication 502 is transmitted in a first portion of a frequency domain 506 and a time domain 508. The eMBB communication 504 is transmitted in a second portion of the frequency domain 506 and the time domain 508. As illustrated, the URLLC communication 502 and the eMBB communication 504 overlap for a time period 510 in the time domain 508. In one embodiment, to facilitate the eMBB communication 504 not interfering with the URLLC communication 502, one or more first symbols of the eMBB communication 504 may be blanked. Thereby, high reliability of the URLLC communication 502 may be obtained. In some embodiments, the one or more first symbols of the eMBB communication 504 may be blanked by puncturing or rate matching.

Figure 6:
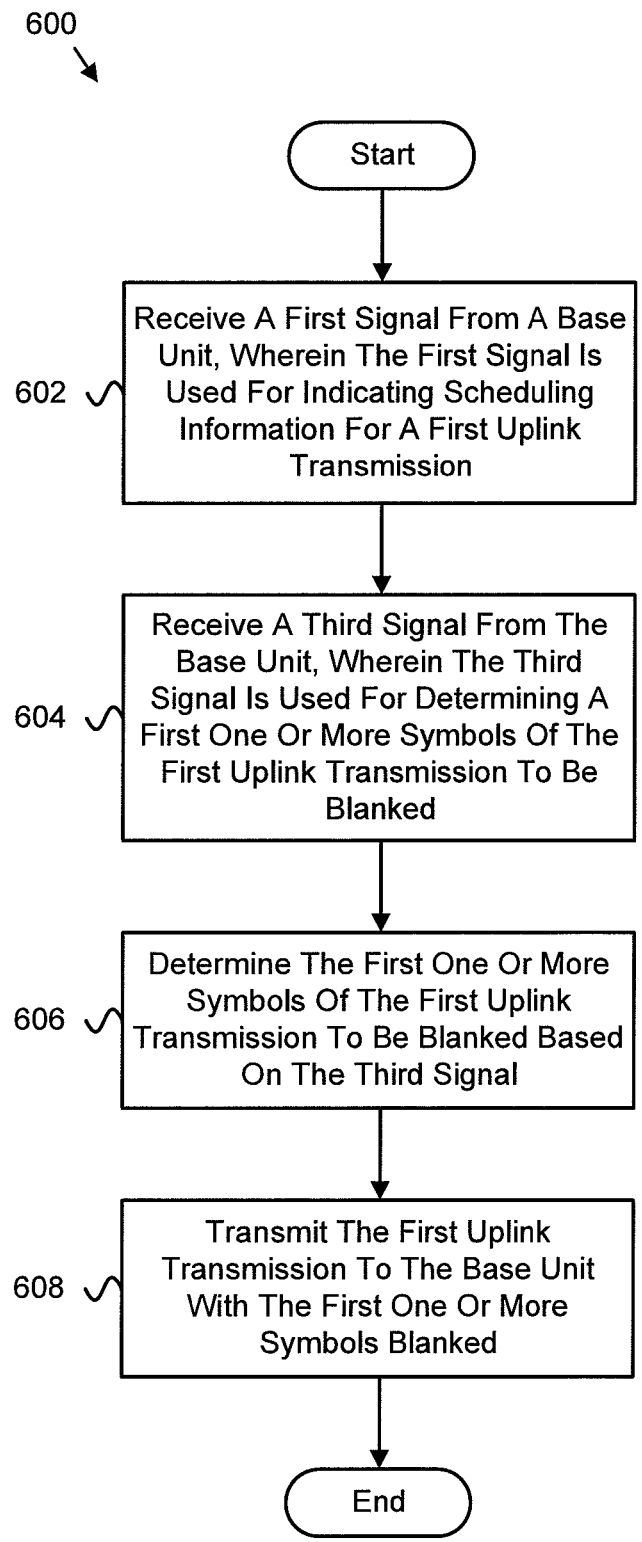
FIG. 6 is a schematic flow chart diagram illustrating one embodiment of a method for uplink transmission blanking.

FIG. 6 is a schematic flow chart diagram illustrating one embodiment of a method 600 for uplink transmission blanking. In some embodiments, the method 600 is performed by an apparatus, such as the remote unit 102. In certain embodiments, the method 600 may be performed by a processor executing program code, for example, a microcontroller, a microprocessor, a CPU, a GPU, an auxiliary processing unit, a FPGA, or the like.

The method 600 may include receiving 602 a first signal from a base unit (e.g., the base unit 104). In such embodiments, the first signal may be used for indicating scheduling information for a first uplink transmission. The method 600 also includes receiving 604 a third signal from the base unit.

In some embodiments, the third signal is used for determining a first one or more symbols of the first uplink transmission to be blanked. In one embodiment, the method 600 includes determining 606 the first one or more symbols of the first uplink transmission to be blanked based on the third signal. In various embodiments, the method 600 includes transmitting 608 the first uplink transmission to the base unit with the first one or more symbols blanked.

In one embodiment, the third signal indicates the first one or more symbols of the first uplink transmission to be blanked. In a further embodiment, the third signal indicates a number of symbols to be blanked at a beginning of the first uplink transmission. In certain embodiments, the third signal is included in the first signal. In some embodiments, the third signal is used to indicate a transmission resource for a second uplink transmission.

In various embodiments, the first one or more symbols of the first uplink transmission are blanked in response to the first uplink transmission immediately following the transmission resource for the second uplink transmission. In some embodiments, a priority of the first uplink transmission is lower than a priority of the second uplink transmission. In one embodiment, the method 600 includes determining the first one or more symbols of the first uplink transmission to be blanked based on cell coverage, subcarrier spacing, timing offset between the first uplink transmission and the second uplink transmission, or some combination thereof. In a further embodiment, the first one or more symbols of the first uplink transmission are blanked by puncturing. In various embodiments, the first one or more symbols of the first uplink transmission are blanked by rate matching.

Figure 7:
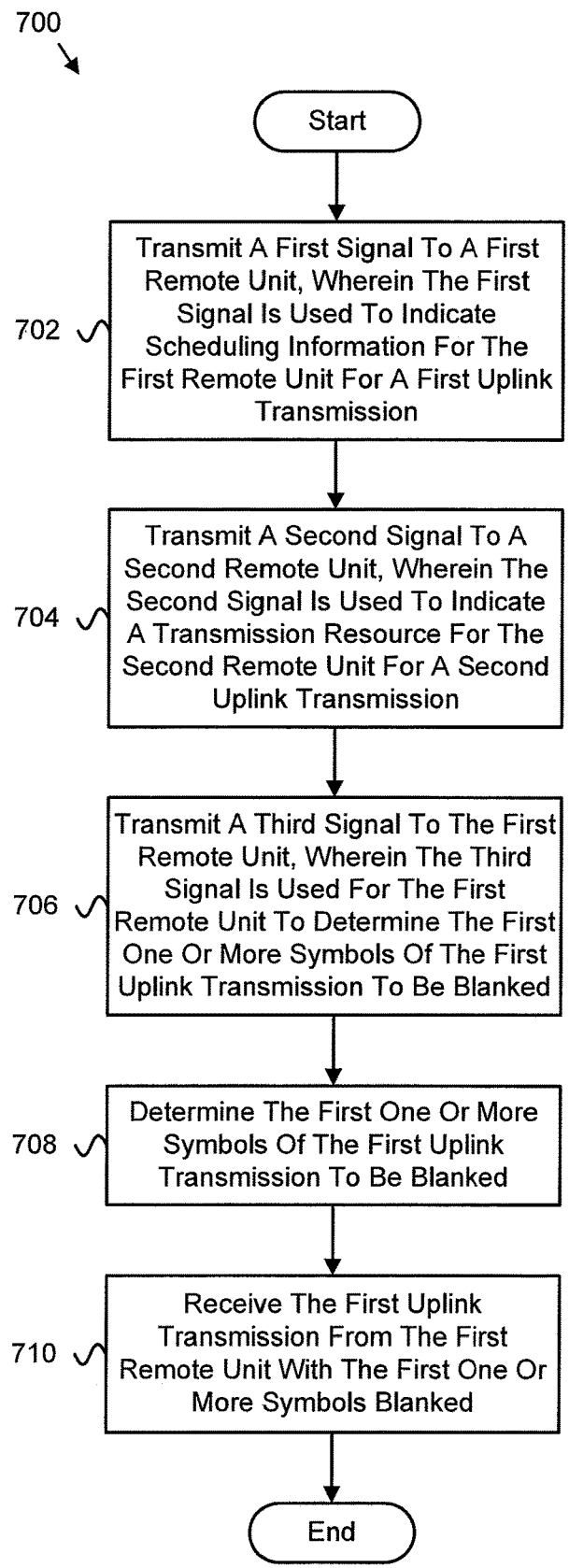
FIG. 7 is a schematic flow chart diagram illustrating another embodiment of a method for uplink transmission blanking.

FIG. 7 is a schematic flow chart diagram illustrating one embodiment of a method 700 for uplink transmission blanking. In some embodiments, the method 700 is performed by an apparatus, such as the base unit 104. In certain embodiments, the method 700 may be performed by a processor executing program code, for example, a microcontroller, a microprocessor, a CPU, a GPU, an auxiliary processing unit, a FPGA, or the like.

The method 700 may include transmitting 702 a first signal to a first remote unit. In certain embodiments, the first signal is used to indicate scheduling information for the first remote unit for a first uplink transmission. The method 700 also includes transmitting 704 a second signal to a second remote unit. In various embodiments, the second signal is used to indicate a transmission resource for the second remote unit for a second uplink transmission. The method 700 includes transmitting 706 a third signal to the first remote unit. In some embodiments, the third signal is used for the first remote unit to determine the first one or more symbols of the first uplink transmission to be blanked. The method 700 also includes determining 708 the first one or more symbols of the first uplink transmission to be blanked. The method 700 includes receiving 710 the first uplink transmission from the first remote unit with the first one or more symbols blanked.

In one embodiment, the third signal indicates the first one or more symbols of the first uplink transmission to be blanked. In a further embodiment, the third signal indicates a number of symbols to be blanked at a beginning of the first uplink transmission. In certain embodiments, the third signal is included in the first signal. In some embodiments, the method 700 includes determining the first one or more symbols of the first uplink transmission to be blanked based on cell coverage, subcarrier spacing, timing offset between the first uplink transmission and the second uplink transmission, or some combination thereof.

In various embodiments, the third signal is the same as the second signal. In some embodiments, the first one or more symbols of the first uplink transmission are blanked in response to the first uplink transmission immediately following the second uplink transmission. In one embodiment, a priority of the first uplink transmission is lower than a priority of the second uplink transmission. In a further embodiment, the first one or more symbols of the first uplink transmission are blanked by puncturing. In certain embodiments, the first one or more symbols of the first uplink transmission are blanked by rate matching.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprising:
a receiver that:
receives a first signal from a base unit, wherein the first signal is used for indicating scheduling information for a first uplink transmission; and
receives a third signal from the base unit, wherein the third signal is used for determining a first one or more symbols of the first uplink transmission to be blanked, and wherein:
the third signal indicates a transmission resource for a second uplink transmission;
a priority of the first uplink transmission is lower than a priority of the second uplink transmission;
the second uplink transmission precedes the first uplink transmission; and
the first uplink transmission at least partially overlaps the second uplink transmission;
a processor that determines the first one or more symbols of the first uplink transmission to be blanked based on the third signal; and
a transmitter that transmits the first uplink transmission to the base unit with the first one or more symbols blanked.

2. The apparatus of claim 1, wherein the processor further determines the first one or more symbols of the first uplink transmission to be blanked based on cell coverage, subcarrier spacing, timing offset between the first uplink transmission and the second uplink transmission, or some combination thereof.

3. A method comprising:
receiving a first signal from a base unit, wherein the first signal is used for indicating scheduling information for a first uplink transmission;
receiving a third signal from the base unit, wherein the third signal is used for determining a first one or more symbols of the first uplink transmission to be blanked, and wherein:
the third signal indicates a transmission resource for a second uplink transmission;
a priority of the first uplink transmission is lower than a priority of the second uplink transmission;
the second uplink transmission precedes the first uplink transmission; and
the first uplink transmission at least partially overlaps the second uplink transmission;
determining the first one or more symbols of the first uplink transmission to be blanked based on the third signal; and
transmitting the first uplink transmission to the base unit with the first one or more symbols blanked.

4. The method of claim 3, wherein the third signal indicates the first one or more symbols of the first uplink transmission to be blanked.

5. The method of claim 3, wherein the third signal indicates a number of symbols to be blanked at a beginning of the first uplink transmission.

6. The method of claim 3, wherein the third signal is received with the first signal.

7. The method of claim 3, wherein the first one or more symbols of the first uplink transmission are blanked in response to the first uplink transmission immediately following the transmission resource for the second uplink transmission.

8. The method of claim 3, wherein the first one or more symbols of the first uplink transmission are blanked by puncturing.

9. The method of claim 3, wherein the first one or more symbols of the first uplink transmission are blanked by rate matching.

10. An apparatus comprising:
a transmitter that:
transmits a first signal to a first remote unit, wherein the first signal is used to indicate scheduling information for the first remote unit for a first uplink transmission;
transmits a second signal to a second remote unit, wherein the second signal is used to indicate a transmission resource for the second remote unit for a second uplink transmission, wherein:
a priority of the first uplink transmission is lower than a priority of the second uplink transmission;
the second uplink transmission precedes the first uplink transmission; and
the first uplink transmission at least partially overlaps the second uplink transmission; and
transmits a third signal to the first remote unit, wherein the third signal is used for the first remote unit to determine the first one or more symbols of the first uplink transmission to be blanked;
a processor that determines the first one or more symbols of the first uplink transmission to be blanked; and
a receiver that receives the first uplink transmission from the first remote unit with the first one or more symbols blanked.

11. The apparatus of claim 10, wherein the processor determines the first one or more symbols of the first uplink transmission to be blanked based on cell coverage, subcarrier spacing, timing offset between the first uplink transmission and the second uplink transmission, or some combination thereof.

12. A method comprising:
transmitting a first signal to a first remote unit, wherein the first signal is used to indicate scheduling information for the first remote unit for a first uplink transmission;
transmitting a second signal to a second remote unit, wherein the second signal is used to indicate a transmission resource for the second remote unit for a second uplink transmission, wherein:
a priority of the first uplink transmission is lower than a priority of the second uplink transmission;

the second uplink transmission precedes the first uplink transmission; and the first uplink transmission at least partially overlaps the second uplink transmission;

transmitting a third signal to the first remote unit, wherein the third signal is used for the first remote unit to determine the first one or more symbols of the first uplink transmission to be blanked;

determining the first one or more symbols of the first uplink transmission to be blanked; and receiving the first uplink transmission from the first remote unit with the first one or more symbols blanked.

13. The method of claim 12, wherein the third signal indicates the first one or more symbols of the first uplink transmission to be blanked.

14. The method of claim 12, wherein the third signal indicates a number of symbols to be blanked at a beginning of the first uplink transmission.

15. The method of claim 12, wherein the third signal is transmitted with the first signal.

16. The method of claim 12, wherein the first one or more symbols of the first uplink transmission are blanked in response to the first uplink transmission immediately following the second uplink transmission.

17. The method of claim 12, wherein the first one or more symbols of the first uplink transmission are blanked by puncturing.

18. The method of claim 12, wherein the first one or more symbols of the first uplink transmission are blanked by rate matching.

* * * * *